United States Patent [19]

Cole

[11] 4,172,575

[45] Oct. 30, 1979

[54] AIRFOIL FLAP CONICAL EXTENSION MECHANISM

[75] Inventor: James B. Cole, Mercer Island, Wash.

[73] Assignee: Boeing Commercial Airplane Company, Seattle, Wash.

[21] Appl. No.: 851,027

[22] Filed: Nov. 14, 1977

Related U.S. Application Data

[63] Continuation-in-part of Ser. No. 780,771, Mar. 24, 1977, abandoned, which is a continuation of Ser. No. 561,096, Mar. 24, 1975, abandoned.

[51] Int. Cl.² .................................................. B64C 9/20
[52] U.S. Cl. .................................... 244/216; 244/215
[58] Field of Search .......................... 244/216, 215, 213

[56] References Cited

U.S. PATENT DOCUMENTS

3,767,140  10/1973  Johnson .............................. 244/216

Primary Examiner—Barry L. Kelmachter
Attorney, Agent, or Firm—H. Gus Hartmann; Bernard A. Donahue

[57] ABSTRACT

A pair of motion-amplifying flap linkages connected externally to the undersurface of a tapered planform airfoil and being spaced apart spanwise thereof for a combined pseudo conical extension movement of a tapered-chord flap section. The pair of flap linkage mechanisms conjointly first extending the tapered chord flap section chordwise of the airfoil and then rotatably tilting the flap to increase its angle of incidence, such that the chordwise length of movement and rotation of the flap, is proportional to the length of the airfoil chord at that cross-section of the airfoil; and approximates a conic motion of the flap relative to the airfoil.

6 Claims, 14 Drawing Figures

4,172,575

AIRFOIL FLAP CONICAL EXTENSION MECHANISM

SUMMARY OF THE INVENTION

This application is a continuation-in-part of application Ser. No. 780,771, filed Mar. 24, 1977, which is a continuation of application Ser. No. 561,096, filed Mar. 24, 1975, both now abandoned.

This invention relates to an extendible and retractible externally hinged, trailing-edge flap mechanism for an airfoil and more particularly to a pair of motion-amplifying linkage mechanisms that are aligned to the streamwise airflow externally of the airfoil envelope and are spaced apart spanwise on a tapered chord flap section, to conjointly extend and deflect the flap so that its chordwise length of movement and angle-of-incidence relative to the fixed portion of the airfoil, is proportional to the length of the airfoil chord at that chordwise cross-section of the airfoil; and that the desired deflection thereof is approximately conic for produving a more uniform spanwise and chordwise aerodynamic loading of the airfoil.

Conventional flap track and roller mechanisms have a so-called cylindrical geometry, in which the amount of flap extension is uniform or the linkage geometry is sized the same for both of the spanwise spaced flap extension mechanisms. However, this cylindrical geometry flap extension mechanism does not closely approximate the desired uniform spanwise and chordwise aerodynamic loading of the airfoil for tapered in planform airfoils having tapered flaps, as is produced by the conical flap extension geometry of the present invention.

An alternative method for producing the conical flap extension motion, as taught by this invention, into the conventional cylindrical geometry track and roller mechanism, would be to have flap tracks which have a curvature in both elevation and planform; coupled with extra-wide fairings for covering the curved tracks. However, the cost and drag penalties would make this method unattractive. A further disadvantage would be that the rollers may bind in the track as the wing deflects and this is detrimental to the operational reliability of the flap system.

This invention is primarily directed to two motion-amplifying flap extension linkage mechanisms which are spaced apart spanwise on an airfoil, for actuating a planform tapered flap; wherein, the two flap mechanisms vary both in size and in their linkage extension ratio, so that their combined operation produces a pseudo conical flap extension movement.

An advantage of this invention is that the motion-amplifying flap linkage mechanism allows a tapered in planform flap to be conically extended in a manner that produces a greater amount of extended flap area than is possible with cylindrical extension geometry.

DETAILED DESCRIPTION OF THE DRAWINGS

Figure 3:
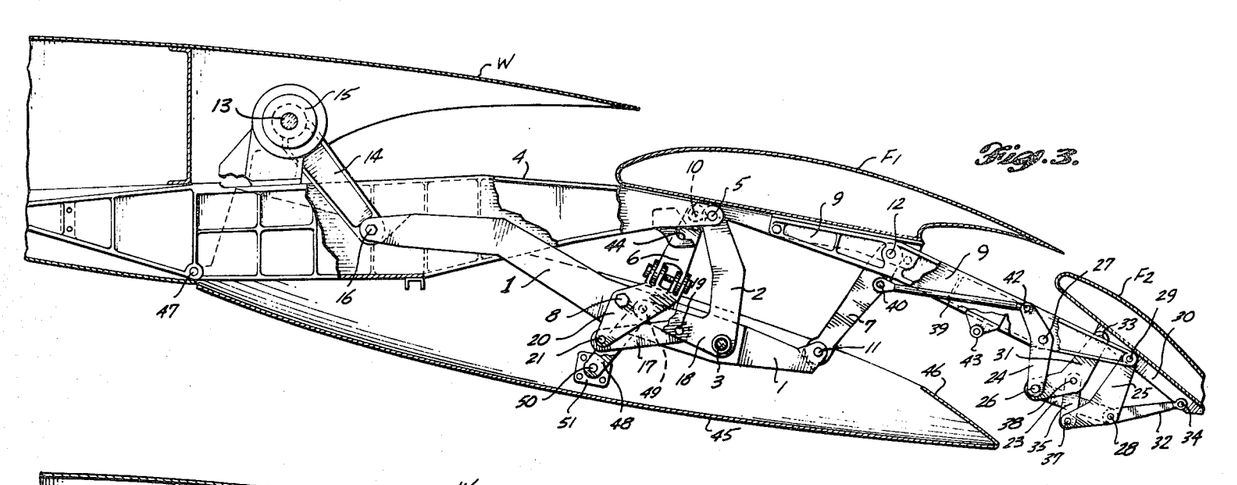
Figure 4:
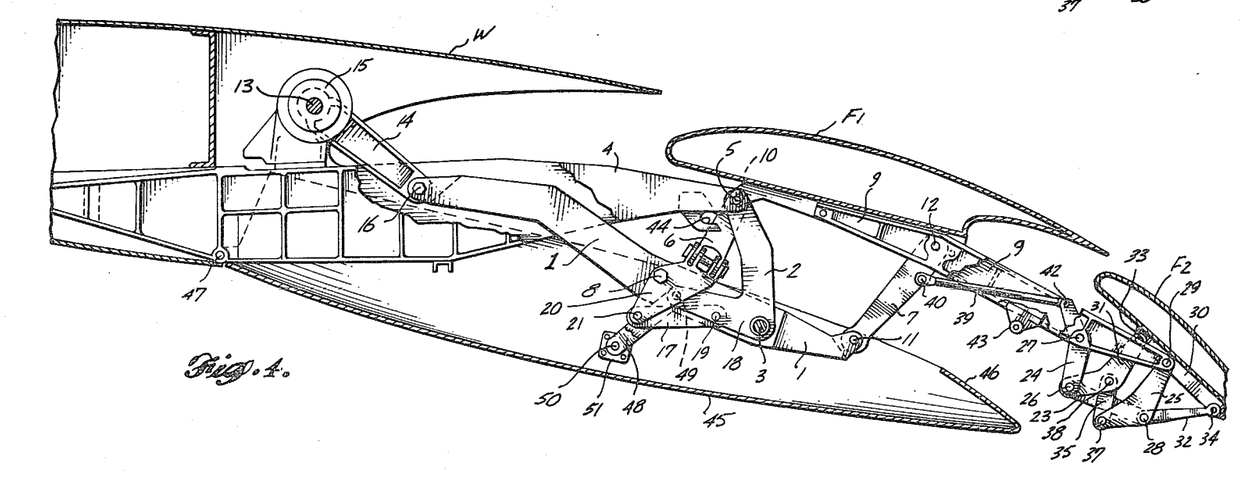

The present invention can be applied to airplane wing trailing-edge flap installations having flaps of different types. The invention is illustrated as being applied to a plural section flap comprising a forward flap section F1 and a rear flap section F2 extending along the trailing edge of the wing W. The flap mounting mechanism of the present invention supports the flap sections for co-ordinated movement between the forward retracted position shown in FIG. 1 in which position the flap sections will be in during cruise flight speed operation of the airplane; and the maximum rearwardly extended and downwardly tilted position shown in FIG. 5, in which position the flap sections will be in during the approach and landing operation of the airplane. FIGS. 2, 3 and 4 show the intermediate positions for the flap sections.

Figure 1:
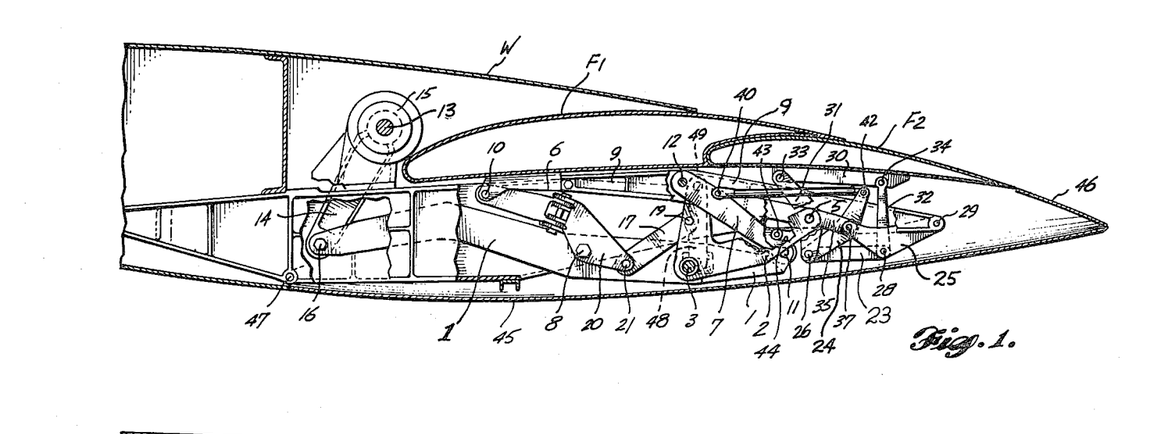
FIGS. 1, 2, 3, 4, and 5 are chordwise, vertical cross-sections of a representative airfoil trailing edge, double-slotted, flap assembly of the present invention, showing the double-slotted flap and linkage mechanism arranged at various stages of extension.
Figure 2:
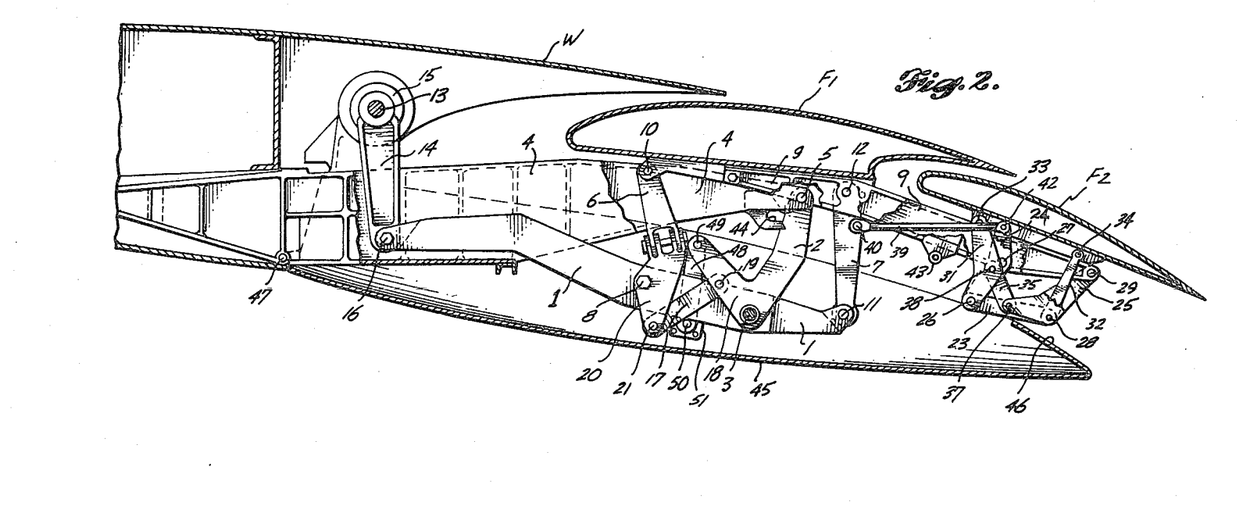

The flap sections, when in the position shown in FIG. 2, have been moved chordwise rearwardly to some extent from their position in FIG. 1. In the FIG. 2 position, the flap sections will have increased the effective wing area to some extent, with little increase in the wing drag. As the flap sections are moved further aft to the position shown in FIG. 3, the effective wing area will increase considerably more, without any substantial increase in wing drag. The flap sections may be disposed in approximately the position of FIG. 3 for the take-off operation of the airplane. When the flap sections are further extended to the position shown in FIG. 4, the chordwise expansion of the wing area is maximum; however, due to the slotted arrangement of the flap sections, their drag will have been increased to some extent. Between the position of the flap sections shown in FIGS. 4 and their position shown in FIG. 5, the flap sections will have been tilted downwardly relative to the wing W, to a higher angle-of-incidence, so as to provide the maximum lift configuration of the flap assembly for use during the approach and landing operation of the airplane.

The forward flap section F1 is supported from the wing W, by a first motion-amplifying compound linkage; and the rear flap section F2 is supported from the forward flap section F1 by a second motion-amplifying compound linkage. The purpose of the motion-amplifying compound linkage is to effect a chordwise translational movement of the supported flap section, relative to the structure which supports it. In the case of the forward flap section F1, such chordwise movement will be relative to the wing W; and with respect to the rear flap section F2, the chordwise movement will be with respect to the forward flap section F1. Since the rear flap section F2 is supported from the forward flap section F1, the rear flap section F2 will be moved chordwise rearward with respect to the wing W, by the chordwise movement of the forward flap section F1 relative to the wing; and in addition, the rear flap section F2 will be moved chordwise relative to the forward flap section F1 and the wing W, by the action of the second motion-amplifying compound linkage which supports the rear flap section F2 from the forward flap section F1.

Figure 7:
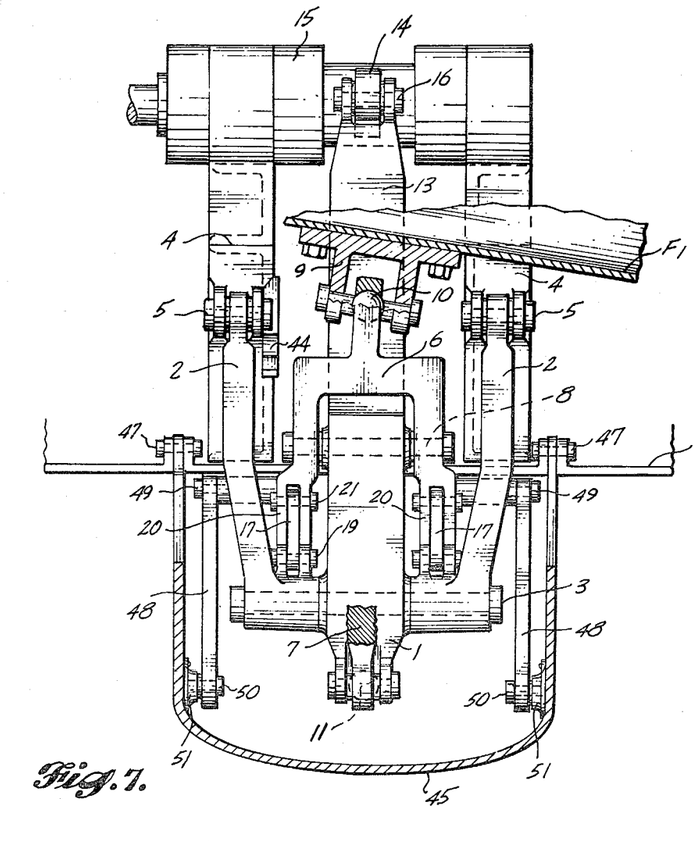
FIG. 7 is a transverse sectional view taken through the inboard flap mechanism on line 7—7 of FIG. 5. On the outboard linkage, link 6A is modified to 6B or 6C as shown on FIGS. 9, 10, 11 and 12.

The first motion-amplifying compound linkage for supporting the forward flap section F1, includes an elongated carrier bar 1, located with its length generally horizontal and extending fore and aft of the airplane. The carrier bar 1 is supported between its ends from fixed structure of wing W by a support link 2 having its swinging end connected at pivot 3 to the carrier bar 1. This support link 2 comprises dual parallel elements, which are shown in FIG. 7, for stability. The upper end of support link 2 is attached by a pivot 5 to the aft end of a fixed structural cantilever beam 4 which projects rearwardly from the wing W. The fore flap section F1 is mounted on the carrier bar 1 by substantially parallel links 6 and 7, which project upward from the carrier bar 1. Links 6 and 7 are located above the carrier bar 1 as is the link 2.

The link 6 swings relative to the carrier bar 1 about the axis of pivot 8 which connects the mid-portion of link 6 to the carrier bar. The swinging upper end of link 6 is connected at pivot 10 to a second movable cantilever beam 9 affixed to the underside of the forward flap section F1. The lower end of link 7 is connected at pivot 11 to the aft end of carrier bar 1. The upper end of link 7 is connected at pivot 12 to the cantilever beam structure 9 which projects rearwardly from the forward flap section F1. Control of the movement of the first motion-amplifying compound linkage, comprising: carrier bar 1; support link 2, which supports the carrier bar 1 from the wing W; and links 6 and 7 which support the forward flap section of F1 up from the carrier bar 1 is effected by longitudinal fore and aft reciprocation of the carrier bar 1.

The actuating means for the first motion-amplifying compound linkage is illustrated as a crank arm 14 projecting radially out from a rotary actuator 15; and the crank arm 14 rotates about a laterl axis 13 extending spanwise of the wing. The combination of crank arm 14 and support link 2, form a somewhat parallel linkage arrangement for supporting the carrier bar 1. The rotary actuator 15 should be capable of rotating the crank arm 14 through an angle of approximately 100° to 120°, and may be either hydraulically or electrically driven. The swinging end of the crank arm 14 is connected at pivot 16 to the forward end of the carrier bar 1. As the crank arm 14 is rotated by the rotary actuator 15, between the position shown in FIG. 1 and the position shown in FIG. 5, the carrier bar 1 will first be principally reciprocated rearwardly from the wing W and then principally swung or tilted relative to the wing W about the axis of pivot 3 by links 2, 6 and 7.

The movement of link 2 about pivot 3 relative to the carrier bar 1, and the movement of parallel links 6 and 7 relative to the carrier bar 1, about pivots 8 and 11 respectively, is coordinated by connecting the link 2 with one of the links 6 or 7, through a coordinating link 17. The aft end of coordinating link 17 is connected by a pivot 19 to an arm 18 which projects forward from the lower end of link 2. Link 2 and arm 18 thereof form a bell crank. The forward end of link 17 is connected at pivot 21 to a downwardly projecting extension 20 of link 6. Movement of support link 2 about pivot 3 in a clockwise direction relative to carrier bar 1, will be accompanied by a coordinated swinging of links 6 and 7 about pivots 8 and 11 respectively, in a counterclockwise direction relative to the carrier bar 1; because, of the interconnection of the two linkage systems by: the link 17, the bell crank arm 18 and the extension 20 of link 6. Such clockwise movement of support link 2 about pivot 3 is effected by the aft reciprocation of carrier bar 1 by crank arm 14 and the actuator 15.

The first motion-amplifying compound linkage is formed by: the carrier bar 1; a first support linkage means comprising support link 2 which supports the carrier bar 1 from the stationary cantilever wing beam 4, and crank arm 14 which supports the forward end of the carrier bar 1; and a second linkage means including parallel links 6 and 7 which support the forward flap section F1 from the carrier bar 1. The function of this first motion-amplifying compound linkage is to effect a generally linear chordwise reciprocation of the forward flap section F1 relative to the wing W, and to alter the angle-of-incidence of the flap section F1 relative to the wing W. As the crank arm 14 is rotated in a counterclockwise direction about the axis 13 of rotary actuator 15, between the positions of FIG. 1 and FIG. 4, through an angle of approximately 90°, the longitudinal reciprocation of the carrier bar 1 effected by such crank arm movement will rotate support link 2 in a counterclockwise direction about its fixed pivot 5.

The swinging end of crank arm 14 carries pivot 16 which connects to the forward extension of the carrier bar 1; and by rotating crank arm 14 in a counterclockwise direction, the lower swinging end of link 2 will move in an upwardly concave arc; but, the movement of carrier bar 1 will be principally fore and aft, that is, a substantially chordwise translational movement. The chordwise displacement of carrier bar 1 rearward relative to wing W will carry the forward flap section F1 correspondingly rearward relative to the wing W. As the support link 2 is rotated about fixed pivot 5 in the counterclockwise direction, it will also rotate about pivot 3 in a counterclockwise direction relative to the carrier bar 1. Such rotation of support link 2 relative to the carrier bar 1, also effects rotation of links 6 and 7 in a clockwise direction relative to the carrier bar 1, because of the interconnection between the linkage means through: coordinating link 17, bell crank arm 18 and extension 20 of link 6. The forward flap section F1, which is connected to the upper end of links 6 and 7 by pivots 10 and 12, will be shifted chordwise rearward relative to the carrier bar 1, in a downwardly concave arc. Because crank arm 14 and support link 2 guide carrier bar 1 to move in an upwardly concave arc relative to beam 4, and because the upper end links 6 and 7 cause the forward flap section F1 to move in a downwardly concave arc relative to the carrier bar 1, the actual combined motion results in a translatory chordwise movement of the flap section F1, that is, substantially linear.

By effecting a rearward reciprocation of the carrier bar 1, relative to the wing w, the forward flap section F1 will be shifted chordwise rearward relative to the wing through a distance approximately twice as great as the distance that carrier bar 1 is shifted relative to the wing by swinging of crank arm 14. This is because the lengths of links 6 and 7, between their pivots 8, 10 and 11, 12, respectively, is approximately the same as the effective length of crank arm 14 between its pivot 16 and the rotative axis 13 of actuator 15, and the effective length of support link 2 between its pivots 3 and 5.

Figure 5:
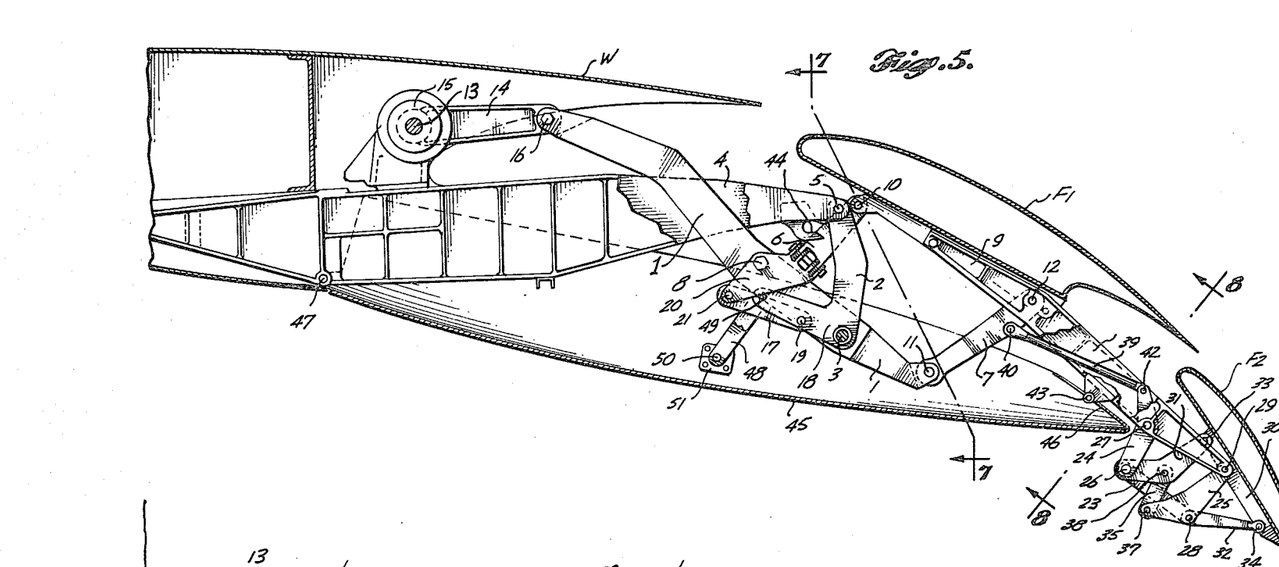
Figure 6:
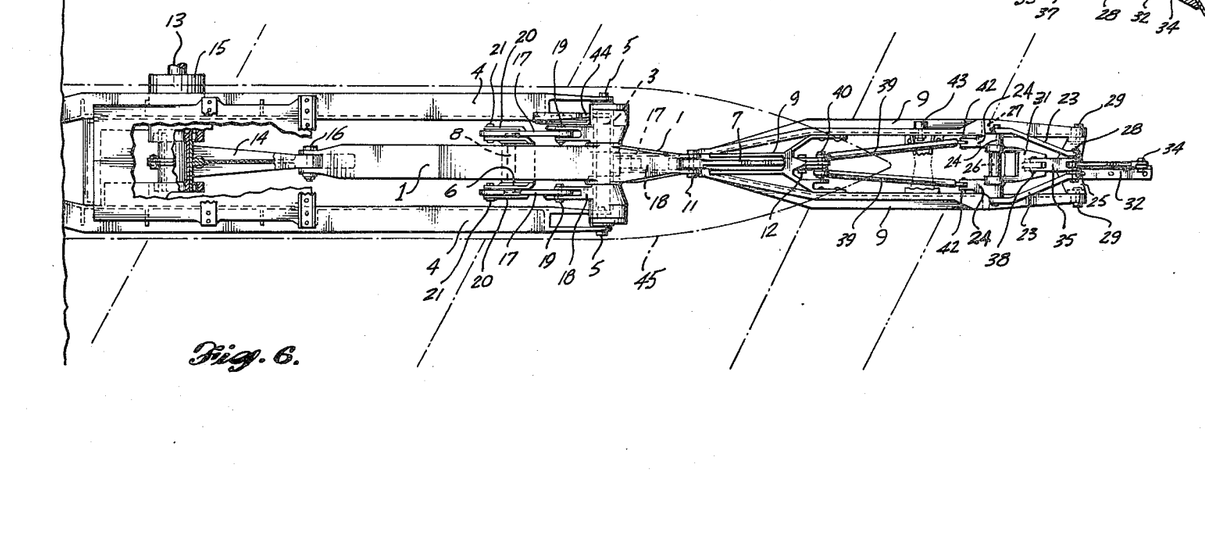
FIG. 6 is a bottom plan view of the flap mounting mechanism shown in the FIG. 5 condition.

When crank arm 14 is rotated in a counterclockwise direction beyond the position shown in FIG. 4, and between the positions of FIGS. 4 and 5, the crank arm will swing from one angular relationship to the lengthwise axis of the carrier bar 1, through a position substantially aligned with the lengthwise axis of the carrier bar 1, to an opposite angular relationship thereto; and during which movement of the crank arm 14, the pivot 16 will pass across a line joining the rotative axis 13 of rotary actuator 15 and support link pivot 3. Such swinging of the crank arm 14 will effect minimum longitudinal reciprocation of the carrier bar 1 and primarily effect a tilting or swinging of the carrier bar 1 about pivot 3. Such tilting of the carrier bar 1 will not appreciably effect swinging of support link 2 about its fixed pivot 5. Forward flap section F1 will be tilted or swung generally in a corresponding manner, because pivot 3 is located substantially centrally between pivots 8 and 11 that connect the flap-supporting links 6 and 7 to the carrier bar 1. Such tilting of the carrier bar 1 will therefore primarily alter the angle-of-incidence of the forward flap section F1 relative to the wing W, rather than shifting such flap section further rearward relative to the wing.

As the rotary actuator 15 rotates the crank arm 14 back towards the flap retraction position or in a clockwise direction from the position of FIG. 5 toward the position of FIG. 1, the first stage of movement will be to tilt or swing the carrier bar 1 in a counterclockwise direction about the pivot 3, of support link 2, and to correspondingly swing the flap section F1; thereby, decreasing the angle-of-incidence of the flap section F1 relative to the wing W. As the actuator 15 continues to rotate the crank arm 14 farther in a clockwise direction from the position of FIG. 4 toward the position of FIG. 1, the tilting of carrier bar 1 will be minimal and its principal movement will be chordwise forward to effect swinging of the support link 2 about its pivot 5 to produce a similar clockwise movement of support link 2 about pivot 3 relative to the carrier bar 1. This clockwise movement of support link 2 about pivot 3 relative to the carrier bar 1 will effect a coordinated swinging motion of the links 6 and 7 (supporting the forward flap section F1) in a counterclockwise direction about pivots 8 and 11 relative to carrier bar 1. This is due to the coordinating link 17 interacting between support link 2 and links 6 and 7 which support the forward flap section F1 from the carrier bar 1.

As the carrier bar 1 is being shifted chordwise forwardly by rotation of crank arm 14 in the clockwise direction, links 6 and 7 rotate counterclockwise about pivots 8 and 11, relative to the carrier bar 1; thereby, shifting flap section F1 chordwise forwardly relative to the carrier bar 1; and such movement of links 6 and 7 will effect a chordwise forward movement of the forward flap section F1 at approximately twice the speed of the forward movement of the carrier bar 1 relative to wing W. Therefore, the forward flap section F1 and the carrier bar 1 will move progressively from the position shown in FIG. 4, through the positions of FIGS. 3 and 2, to the most forward position shown in FIG. 1 which corresponds to the retracted position of the wing trailing edge flap system.

Referring now to the aft flap section installation: a rear flap section F2 is supported from the forward flap section F1 by a kinematic linkage mechanism somewhat similar to that by which the forward flap section is supported from the carrier bar 1. A second cantilever beam 9 is affixed to the under surface of forward flap F1 and projects rearwardly therefrom to serve as the support structure for the rear flap section F2. A second elongated carrier bar 23 with its length extending fore and aft is supported beneath the trailing portion of the second cantilever beam 9 by approximately parallel links 24 and 25. The lower end of the forward link 24 is connected at pivot 26 to the forward end of the second carrier bar 23, and the mid-portion of link 24 is connected at pivot 27 to the trailing portion of the second cantilever beam 9. A mid-portion of the aft link 25 is connected at pivot 28 to the rear portion of the second carrier bar 23. The upper end of link 25 is pivoted at 29 to the trailing end of the second cantilever beam 9.

A lower structural attachment portion 30 of the rear flap section F2 is connectably supported by somewhat parallel links 31 and 32 which project up from the second carrier bar 23. The lower end of link 31 is attached at pivot 26 to the carrier bar 23; which pivot 26 is the same connection that connects the lower end of link 24 to the carrier bar 23. The upper end of link 31 is connected by pivot 33 to the forward end of the lower structural attachment portion 30 of flap section F2. Similarly, the upper end of link 32 is connected at pivot 34 to the aft end of the lower structural attachment portion 30 of the rear flap section F2. The lower end of the aft link 32 is attached at pivot 28 to the secondary carrier bar 23, which pivot 28 is the same as connects the mid-portion of link 25 to such carrier bar.

It will be noted that, as in the first motion-amplifying compound linkage supporting the forward flap section F1, the linkage means of the second motion-amplifying compound linkage which supports the rear flap section F2 from the cantilever beam 9, is also located external to and beneath the rear flap section F2. In order to coordinate the swinging motion of the links 31 and 32, which support the second flap section F2, relative to the swinging motion of links 24 and 25, which support the second carrier bar 23, the link 31 is connected at its mid-portion 38 to the link 25 by a second coordinating link 35. One end of this second coordinating link 35 is connected at pivot 37 to the lower end of link 25. A line connecting the pivots 28 and 37 is at a substantial angle to the extension of a line passing through pivots 29 and 28, so that the lower end of link 25 substantially forms it into a bell crank. The other end of the second coordinating link 35 is connected at pivot 38 to the mid-portion of link 31. The second coordinating link 355 effects swinging of links 31 and 32 about pivots 26 and 28 relative to the second carrier bar 23, in the direction opposite to the swinging of links 24 and 25 about pivots 26 and 28 relative to carrier bar 23.

When the dual flap members are moving from their position shown in FIG. 1 through their positions of FIG. 2, to their position shown in FIG. 3, the links 24 and 25 of the aft flap section F2 are rotating about pivots 26 and 28 in a counterclockwise direction relative to the second carrier bar 23. The movement of the second coordinating link 35, affected by such swinging of link 25 relative to the second carrier bar 23, causes link 31 and in turn link 32, to rotate about pivots 26 and 28 in a clockwise direction relative to the second carrier bar 23.

Swinging of links 31 and 32 relative to the second carrier bar 23 in a clockwise direction, while links 24 and 25 are swinging in a counterclockwise direction, relative to such carrier bar, produces a second motion-amplifying movement of the rear flap section F2 relative to the second cantilever beam 9. Since link 31 between its pivots 26 and 33, and link 32 between its pivots 28 and 34, are approximately of the same length as: the length of link 24 between its pivots 26 and 27; and the length of link 25 between its pivots 28 and 29; the coordinated swinging of these links 31, 32, 24 and 25 will effect a chordwise translational movement of the rear flap section F2 relative to the second cantilever beam 9 (and the forward flap section F1); thereby, resulting in approximately twice as great a movement of the rear flap section F2, as the movement of second carrier bar 23 relative to the second cantilever beam 9.

Not only are the motions of links 24, 25 and links 31, 32 coordinated with each other, but their arrangement and motion which provides the second motion-amplifying compound linkage that supports the rear flap section F2 from cantilever beam 9, is controlled by the movement of the first motion-amplifying compound linkage, which supports the forward flaps section F1 from the wing cantilever beam 4. Such controlled movement of the second motion-amplifying compound linkage from forward flap section F1, is transmitted by an interconnecting control link 39 having its forward end connected by pivot 40 to link 7 of the first motion-amplifying compound linkage and the aft end of the interconnecting control link 39 is connected at pivot 42 to the upper end of link 24. Consequently, whenever link 7 is swung about pivot 12 relative to forward flap section F1, the interconnecting control link 39 will effect a corresponding swinging motion of link 24 about pivot 27 relative to the second cantilever beam 9. Swinging of link 24 about pivot 27 will effect corresponding swinging of link 25 about pivot 29, because both of these links are pivotally connected to the second carrier bar 23; and swinging of link 25 about pivot 29 relative to the second carrier bar 23 will effect a corresponding swinging motion of links 31 and 32 relative to the second carrier bar 23 through the second coordinating link 35, as previously described.

Swinging of link 7 relative to the second cantilever beam 9 about pivot 12 occurs principally during movement of the double-slotted flap system between the positions of FIG. 1 through to the position of FIG. 3. Very little relative movement between link 7 and the second cantilever beam 9 occurs during movement of the double-slotted flap system from its position of FIG. 3, through to its position of FIG. 5. Consequently, the interconnecting control link 39 which is connected at 40 to the link 7 will effect movement of the second motion-amplifying compound linkage, which supports the rear flap section F2 from the second cantilever beam 9, primarily during movement of the double-slotted flap system from the position of FIG. 1 through to the position of FIG. 3, and there will be little or no movement of the second motion-amplifying compound linkage, or the rear flap section F2 relative to the second cantilever beam 9 during FIGS. 3 to 5.

As has been previously discussed, the principal movement of the forward flap section F1, between the position of FIG. 3 and the position of FIG. 5, is to increase its angle-of-incidence relative to the wing W. During movement of the double-slotted flap system between its position of FIG. 3 and FIG. 5, both flap sections will move substantially conjointly to vary their angle-of-incidence relative to the wing W. The angle-of-incidence of both flap sections will increase during movement from the position of FIG. 3, through to the position of FIG. 5; and conversely the angle-of incidence of both flap sections will decrease as they are moved from their position of FIG. 5, through to their position of FIG. 3.

Figure 8:
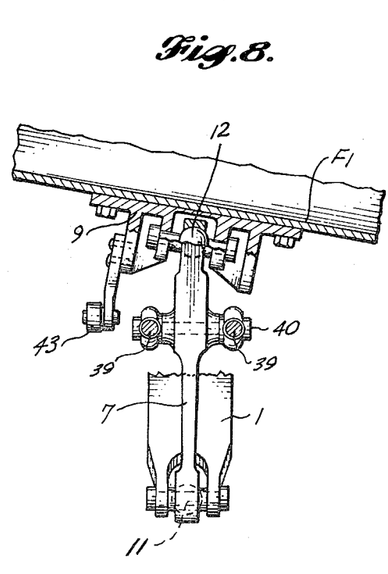
FIG. 8 is a transverse sectional view taken along line 8—8 of FIG. 5.

During high-speed flight, with the flaps fully retracted as shown in FIG. 1, it is desirable to support the second cantilever beam 9 directly from the wing cantilever beam 4; instead of indirectly through the medium of the first motion-amplifying compound linkage, including links 2, 17, 6 and 7. For this purpose, as shown in enlarged detail in FIG. 8, a roller 43 is mounted on the second cantilever beam 9 for engagement with the hook 44, as shown more clearly in FIGS. 2–5, when the first motion-amplifying compound linkage is in the position shown in FIG. 1. Also, during high-speed flight with the flaps retracted as shown in FIG. 1, in order to minimize drag on the airplane wing, it is preferred that the flap-supporting and flap-actuating linkage be enclosed. For this purpose a bottom cowling section 45 is shown having an upper surface trailing edge portion 46 that can be disposed in faired relationship with the upper surfaces of the forward flap section F1 and the rearward flap section F2 in the contracted condition shown in FIG. 1. It is, however, necessary to move such cowling outwardly from the position shown in FIG. 1 in order to afford room for movement of the motion-amplifying compound linkages and the flap sections F1 and F2 from the position of FIG. 1 through the positions of FIGS. 2, 3 and 4, to the position of FIG. 5, as described above. Consequently, the forward portion of the cowling 45 is connected by a pivot 47 to the wing structure, about the axis of which pivot the cowling can swing downward through the position of FIG. 2 to the position shown in FIGS. 3, 4 and 5.

Swinging of the cowling 45 between its upper position of FIG. 1 and its lower position of FIGS. 3, 4 and 5 about its pivot 47 is accomplished by swinging of support link 2 relative to the first cantilever beam 4. The mechanism for effecting such swinging includes an upright link 48 having its upper end connected by pivot 49 to the arm 18 of support link 2. The lower end of link 48 is connected at pivot 50 to a fitting 51 attached to the cowling 45. As the support link 2 rotates in a counterclockwise direction relative to the first cantilever beam 4, as shown from FIGS. 1 to 3, the outer end of arm 18 will swing downward, pushing link 48, and consequently fitting 51, downward. Such movement will swing cowling 45 downward about its pivot 47. The cowling will remain practically stationary in the position shown in FIGS. 3, 4 and 5 during the principal expansion and deflection downward of the flap assembly.

The cowling 45 will remain in its lowered position of FIGS. 3, 4 and 5 as the flap assembly is retracted from the position of FIG. 5, through the position of FIG. 4, to the position of FIG. 3. Further movement of the flap assembly toward the completely retracted condition of FIG. 1 will be accompanied by clockwise swinging of support link 2 relative to the first cantilever beam 4, so that the forward end of the arm 18 of support link 2, will move upward to pull link 48 upward correspondingly, and thus move fitting 51 and cowling 45 back through the position of FIG. 2 to the position of FIG. 1.

FIGS. 9, 10, 11 and 12 show the detailed modification to links 6, 7, 31 and 32 which will permit sideward tilting of the flap extension mechanism relative to the flap panels F1 and F2, to accommodate a planform rotation of the individual flap panel members as they are extended chordwise and downward in a pseudo conical member in accordance with the present invention.

Pseudo conical geometry is defined herein as the geometric extension movement of a tapered chord flap section, such that the position of the flap members at any spanwise location along the wing or airfoil member is proportional to the width of the chordwise cross-section of the airfoil at that location.

The flap extension mechanism of this invention permits: first, a substantially chordwise translational movement of the individual flap panels F1 and F2 for increasing the planform area of the wing without a substantial increase in drag due to downward deflection of the flap panels; and second, a primarily downward deflection of the flap panels F1 and F2 without any substantial further aft translational movement thereof; and third, a pseudo conical motion change of the individual flap panels F1 and F2, both in the spanwise skewing motion during the varying chordwise translational movement than is capable of being produced by the generally parallel motion or cylindrical arc of conventionally mounted flap panels. These conventionally mounted flap panels are generally of the track and roller type which produce a so-called cylindrical flap extension geometry; because, the flap extension mechanism is sized the same at either spanwise end of the flap panel or the extension geometry is the same and imparts the same amount of movement at each spanwise station. In order for these known flap extension mechanisms to perform in the manner set forth in this invention, the flap tracks would have to be made with curvature in both elevation and planform views, in addition to providing extra-wide fairings for covering these curved tracks. However, the cost in drag penalties of such a curved track and roller mechanism would make this approach unattractive.

Figure 13:
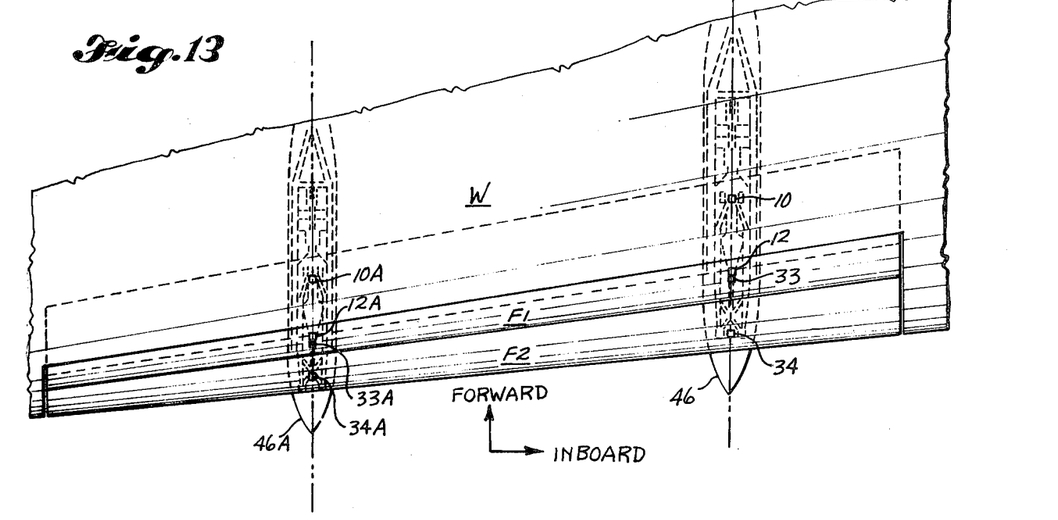
FIGS. 13 and 14 are plan views of a sweptback and planform tapered airfoil showing the two flap extension mechanisms which vary both in size and in their linkage extension ratio so that their combined operation produces the pseudo conical extension movement of the double-slotted flap sections.
Figure 14:
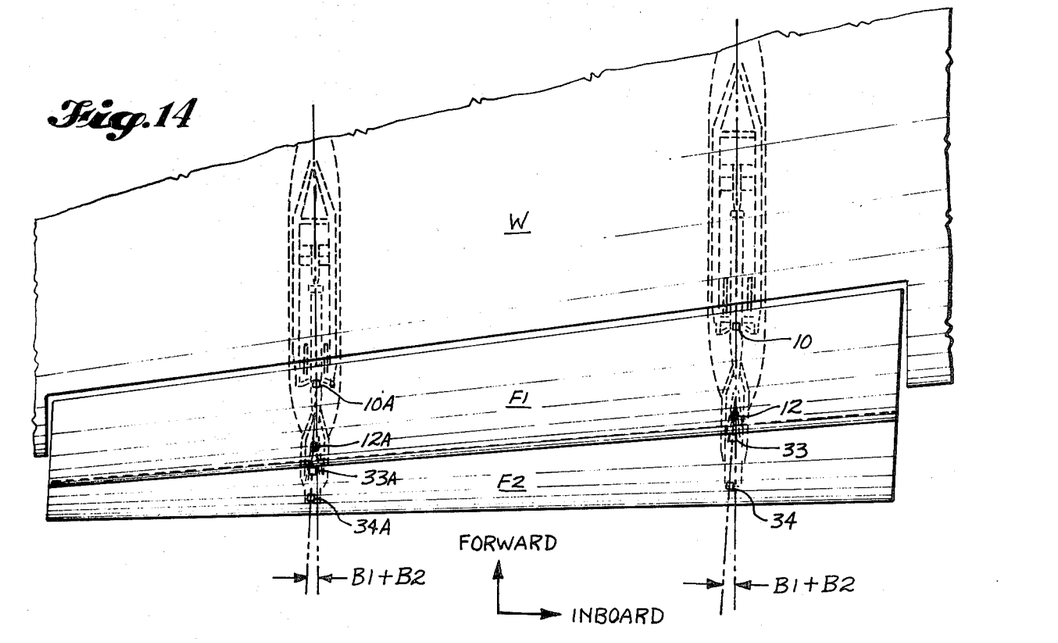

FIGS. 13 and 14 are wing planform views of the flap panels F1 and F2, and show the retracted and extended positions respectively, of the flap extension geometry of this invention. Both of the spanwise spaced inboard and outboard flap extension mechanisms are substantially similar except for their size which produces the pseudo conical geometrical extension movement and except for certain of the links, namely 6, 7, 31 and 32 which bend or flex sidewards to permit a spanwise movement of the flap panel connecting points relative to the extension mechanism.

Referring to FIGS. 13 and 14, the outboard flap extension mechanism, for the tapered chord flap panels F1 and F2, is of less size than the inboard mechanism and has its elements identified by the letter A suffix to the numeral as shown in the FIGS. 13 and 14. Ball joints are provided at points 10, 10A, 11, 11A, 12 and 12A. For the forward flap panel F1, the pivotal attachment points to the first motion amplifying extension mechanism are: 10 and 12 for the inboard mechanism, and 10A and 12A for the outboard mechanism. For the rear flap panel F2, the pivotal attachment points to the second motion-amplifying mechanism are: 33 and 34 for the inboard mechanism, and 33A and 34A for the outboard mechanism. For the flap panels F1 and F2, the spanwise outboard pivotal attachment points 10A, 12A and 33A, 34A, will move a lesser amount when the flaps are extended, than the spanwise inboard points 10, 12, and 33, 34; and the flap panels will skew through a planform angle of B1 for the forward flap panel F1, and an angle B2 for the rear flap panel F2. Also, when the flaps are deflected to a downward curvilinear position, the outboard flap connecting points will likewise move downward a lesser amount than the inboard flap connecting points; thereby, requiring three of the four flap connecting links to accommodate a sidewards or spanwise motion of the flap panel. The flap revolves about the forward attachment point 10. This attach point is a ball joint which will allow rotation, but will react the flap side load. The aft links 7 and 7A have ball joints at attachment points 10, 10A, 11, and 11A to accommodate the planform rotation of the flap panels and the resulting panel tilt as shown in FIG. 7.

Figure 9:
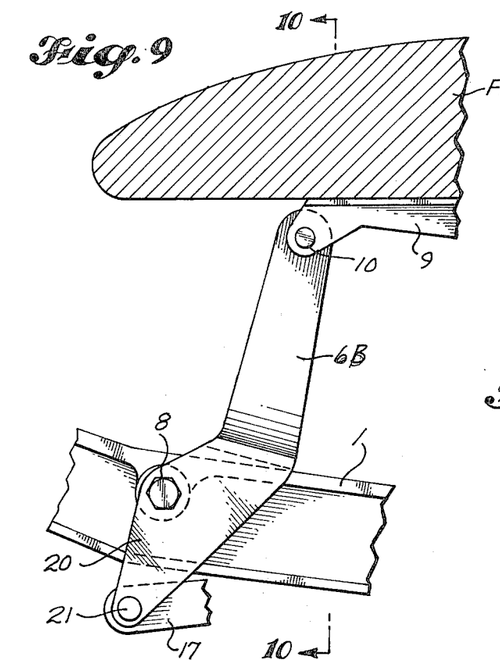
FIG. 9 is a side view of an enlarged detailed modification to link 6A on the outboard linkage, depicting a flexible bendable link.
Figure 10:
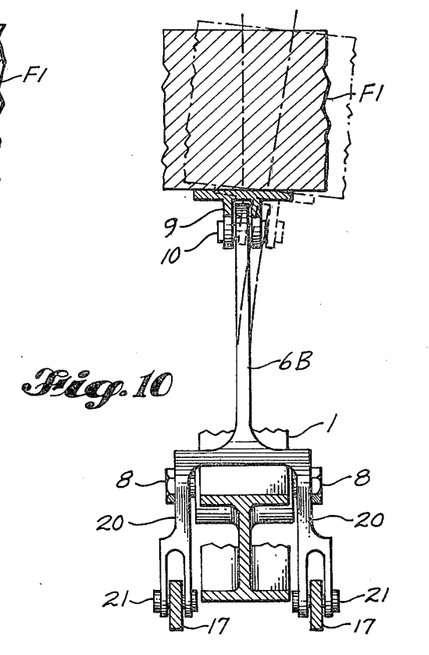
FIG. 10 is a transverse sectional view taken along 10—10 of FIG. 9.
Figure 11:
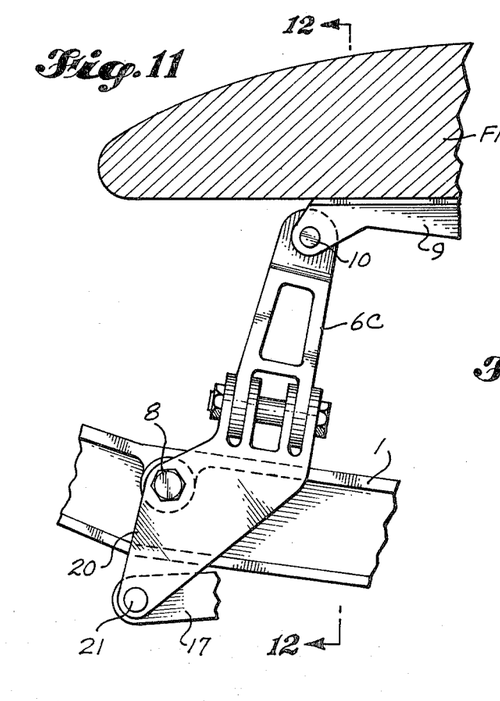
FIG. 11 is a side view of an enlarged detailed second modification to link 6A on the outboard linkage depicting a pivoted joint type of link.
Figure 12:
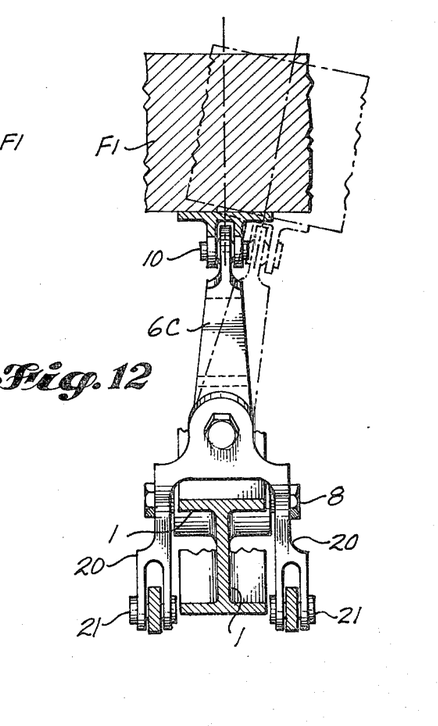
FIG. 12 is a transverse sectional view taken along 12—12 of FIG. 11.

If the flap panel has three spanwise spaced flap extension linkage mechanisms, then five of the six connecting links must have means for providing a sidewards or spanwise movement of the linkage connecting points to the flap panel. This could be accomplished by modifying link 6 with either: the jointed type link shown in FIGS. 11 and 12, or the flexibly bendable link shown in FIGS. 9 and 10. Preferably the two outside linkage mechanisms and the aft center connecting link would provide for the sideward movement of the flap panel.

Where the skewed angles B1 and B2 of the flap in planform rotation and the resulting movement of the connecting linkage is small, the portion of the link 6 between points 8 and 10, on either the inboard or outboard linkage, could be made slender as shown in FIGS. 9 and 10; and this would permit the link to bend or flex sideways a small amount in order to accommodate the sideward movement of the flap panel connecting points, without the necessity of the pivoted joint type of link shown in FIGS. 11 and 12.

One embodiment of the invention, such as that shown in FIGS. 13 and 14, wherein a dual flap extension mechanism is spaced apart spanwise on the flap panels F1 and F2, it will be noted (referring to the forward flap panel F1) that the flap-to-linkage connecting point 10 follows the chordwise centerline of the linkage mechanism as this flap panel is extended. At this connecting point 10 and also at 10A, 12 and 12A a self-aligning bearing is used to accommodate the skewing and tilting of the flap panel F1. A support link 6 of the type shown in FIG. 7 would be utilized on the inboard linkage in order to provide for lateral rigidity. However, on the outboard linkage of the forward flap panel F1, point 10 must move from the centerline during the extension movement of the flap in order to provide for skewed angle B1 in planform, and the resulting pseudo conical geometry of the flap panel when it is deflected to its downward curved position. Therefore, it is necessary that the link 6A be modified in accordance with either the flexible link 6B shown in FIGS. 9, 10, or the jointed link 6C shown in FIGS. 11, 12, in order to provide for this sideward deviation.

A similar relationship would apply to the rear flap panel F2, in that at the inboard forward, flap-to-linkage connecting point 33, 33A, 34 and 34A a self-aligning bearing is used. A support link 6A of the type shown in FIG. 7 would also be utilized on the inboard linkage for providing lateral rigidity, since this connecting point 33 wound follow the offset chordwise centerline of the second cantilever beam 9 as the rear flap panel F2 is extended. Likewise, the remaining flap-to-linkage connecting points 34, 33A and 34A, of the rear flap panel F2, must also move from the chordwise centerline of the linkage mechanism during the extension movement of this flap in order to provide for the planform skewing angle B2 and the resulting pseudo conical geometry of this rear flap panel as it is moved to its downward curvilinear position. Therefore, it would be necessary that the link 31A also be modified in accordance with either the flexible link 6B shown in FIGS. 9, 10, or in the jointed link 6C shown in FIGS. 11, 12, in order to provide for this sideward deviation.

What is claimed is:

1. A pair of flap linkage mechanisms mounted to the undersurface of a tapered airfoil and being spaced apart spanwise thereof forming an inboard and an outboard flap linkage mechanism for extending and retracting a tapered chord flap, each of said flap linkage mechanisms comprising: a cantilever beam fixedly mounted to the undersurface of the airfoil and extending rearward thereof; a first link having one end pivoted to the rear end of the cantilever beam; a carrier member elongated chordwise of the airfoil and being pivoted between its fore and aft end to the swinging portion of said first link; a driving arm rotatably mounted to airfoil structure and having its movable arm connected to the foreward end of said carrier member; said first link and said driving arm being swingable in a generally parallel relationship for shifting of said carrier member translatably chordwise, relative to said cantilever beam; a pair of generally parallel second links pivotally connected at one end, in a spaced apart fore and aft relationship, to the carrier member, and pivotally connected at their other ends to the undersurface of the tapered chord flap; said pair of second links comprising a forward second link and an aft second link, for swingably translating the flap chordwise, relative to said carrier member; a coordinating linkage interconnected between said first link and said pair of second links for moving the flap sequentially from the airfoil, in rearward translation and changing its angle-of-incidence, relative to the airfoil, when said driving arm shifts said carrier member rearward relative to the airfoil; and said inboard and outboard flap linkage mechanisms varying in size from each other, such that their linkage geometry conjointly produces a pseudo conical flap extension and angle-of-incidence change of the flap, which is proportional to the chord length of the airfoil at each spanwise location.

2. The flap linkage mechanism as set forth in claim 1, wherein the forward second link of the outboard flap linkage mechanism is flexibly bendable for accommodating spanwise movement of the flap-to-linkage connecting points, due to planform skewing and curvilinear downward deflection of the pseudo conical flap extension.

3. The flap linkage mechanism as set forth in claim 1, wherein the forward second link of the outboard flap linkage mechanism is jointed for accommodating spanwise movement of the flap-to-linkage connecting points, due to planform skewing and curvilinear downward deflection of the pseudo conical flap extension.

4. A pair of flap linkage mechanisms mounted to the undersurface of a tapered airfoil and being spaced apart spanwise forming an inboard and an outboard flap linkage mechanism for extending and retracting a dual secton flap having a fore-flap section and an aft-flap section, each of said flap linkage mechanism comprising: a first cantilever beam fixedly mounted to the undersurface of the airfoil and extending rearward thereof; a first link having one end pivoted to the rear end of the first cantilever beam; a first carrier member elongated chordwise of the airfoil and being pivoted between its fore and aft end to the swinging portion of said first link; a first driving arm rotatably mounted to airfoil structure and having its movable arm connected to the foreward end of said first carrier member; said first link and said first driving arm being swingable in a generally parallel relationship for shifting of said first carrier member translatably chordwise, relative to said first cantilever beam; a pair of generally parallel second links pivotally connected at one end, in a spaced fore and aft relationship, to the first carrier member, and pivotally connected at their other ends to the undersurface of the fore-flap section; said pair of second links comprising a forward second link and an aft second link, for swingably translating the fore-flap section chordwise, relative to said first carrier member; a first coordinating linkage interconnected between said first link and said pair of second links for moving the fore-flap section sequentially from the airfoil, in rearward translation and changing its angle-of-incidence, relative to the airfoil, when said first driving arm shifts said first carrier member rearward relative to the airfoil; a second cantilever beam fixedly mounted to the undersurface of the fore-flap section and extending rearward therefrom; a pair of generally parallel third links pivotally supported at one end, in a spaced apart fore and aft relationship from the second cantilever beam; a second carrier member elongated chordwise of the airfoil and being supportably connected by the other ends of said pair of third links; an interconnecting control link between said aft second link and said pair of third links for effecting swingable translational movement chordwise of said second carrier member relative to said second cantilever beam; a pair of generally parallel forth links pivotally connected at one end, in a spaced apart fore and aft relationship, to the second carrier member, and pivotally connected at their other ends to the undersurface of the aft-flap section for swingably translating the aft-flap section chordwise, relative to the second carrier member; a second coordinating linkage interconnected between said pair of third links and said pair of fourth links for moving the aft-flap section sequentially from the fore-flap section, in rearward translation and changing its angle-of-incidence, relative to the fore-flap section, when said interconnecting control link shifts said second carrier member rearward relative to the fore-flap section; and said inboard and outboard flap linkage mechanisms varying in size from each other, such that their linkage geometry conjointly produces a pseudo conical flap extension and angle-of incidence change of the flap, which is proportional to the chord length of the airfoil at each spanwise location.

5. The flap linkage mechanism as set forth in claim 4, wherein the forward second link of the outboard flap linkage mechanism is flexibly bendable for accommodating spanwise movement of the flap-to-linkage connecting points, due to planform skewing and curvilinear downward deflection of the pseudo conical extension of fore-flap and aft-flap sections.

6. The flap linkage mechanism as set forth in claim 4, wherein the forward second link of the outboard flap linkage mechanism is jointed for accommodating spanwise movement of the flap-to-linkage connecting points, due to planform skewing and curvilinear downward deflection of the pseudo conical extension of fore-flap and aft-flap sections.

* * * * *